3,222,360
DIOXAZOLYLPENICILLINS
Josef Fried, Princeton, N.J., assignor to Olin Mathieson Chemical Corporation, New York, N.Y., a corporation of Virginia
No Drawing. Filed Dec. 3, 1962, Ser. No. 241,483
7 Claims. (Cl. 260—239.1)

This invention relates to dioxazolylpenicillins. More particularly, the invention relates to new 1,3,4-dioxazolyl-penicillins of the formula (I)
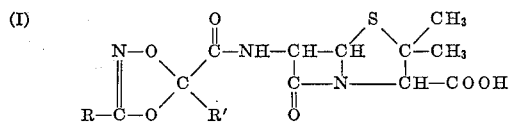

and to salts thereof.

R in Formula I represents aryl, substituted aryl, heterocyclic and substituted heterocyclic groups and R' represents alkyl, substituted alkyl, aryl, substituted aryl, aralkyl, substituted aralkyl, heterocyclic, substituted heterocyclic, heterocyclic alkyl and substituted heterocyclic alkyl groups.

The aryl and substituted aryl groups represented by R and R' in Formula I are monocyclic, carbocyclic aryl groups which may be particularly represented by the radical $(X)_m$-phenyl, wherein X represents hydrogen, halogen, nitro, hydroxy, amino, lower acylamido, trihalomethyl, lower alkoxy and lower acyloxy, and $m$ represents 1, 2 or 3. That is to say, the symbols represent an unsubstituted group such as phenyl or a phenyl group which contains 1 to 3 substituents represented by the symbol X. Illustrative of the substituted phenyl groups are the following: halophenyl, e.g., o-, m- and p-chlorophenyl, o-, m- and p-bromophenyl, o-, m- and p-nitrophenyl, 3,4-dinitrophenyl, 2,3-dibromophenyl, 3,4-dichlorophenyl, o-, m- and p-hydroxyphenyl, lower alkylphenyl, e.g., o-, m- and p-tolyl, o-, m- and p-xylyl, mesityl, lower acylamido, e.g., p-acetamido, lower alkoxyphenyl, e.g., p-methoxyphenyl, p-ethoxyphenyl, lower alkanoyloxyphenyl, e.g., p-acetylphenyl, trihalomethylphenyl, e.g., o-, m- and p-trifluoromethylphenyl, o-, m- and p-trichloromethylphenyl, 3,4-di(trifluoromethyl)phenyl and the like.

The heterocyclic and substituted heterocyclic groups represented by R and R' in Formula I are monocyclic heterocyclic groups which may be represented by the radical $(X)_m$-heterocyclic, wherein X represents hydrogen, halogen, nitro, hydroxy, amino, lower acylamido, trihalomethyl, lower alkyl, lower alkoxy and lower acyloxy $m$ represents 1, 2 or 3 and heterocyclic represents a furyl, pyridyl, pyrimidyl, pyrazinyl or pyridazinyl residue.

The alkyl groups represented by R' and included in the substituent groups X are straight and branched chain lower alkyl groups such as methyl, ethyl, propyl, isopropyl, butyl, isobutyl, t-butyl, amyl, isoamyl, hexyl and the like. The alkyl groups may also contain 1 to 3 of the groups represented by X.

Each of the four halogens is contemplated by the terms "halo" and "trihalomethyl," but in the case of the halogens themselves chlorine and bromine are preferred while trifluoromethyl is the preferred trihalomethyl group.

The acyl groups are preferably lower alkanoyl groups derived from lower fatty acids including for example, acetyl, propionyl, butyryl and the like.

The preferred members of the classes defined by Formula I are those wherein R is phenyl and R' is methyl or benzyl.

The compounds of Formula I form salts with inorganic and organic bases. Among the salts suitable for use in connection with their physiological activity are the alkali metal salts, e.g., sodium and potassium, alkaline earth metal salts, e.g., magnesium and calcium, and amine salts, such as tertiary amine salts including for example, the tri(lower alkyl)amines, e.g., trimethylamine and triethylamine, and heterocyclic amines, e.g., N-methylpiperidine, N-methylmorpholine and N,N'-dibenzylethylenediamine.

The new compounds of this invention are physiologically active substances having a high degree of antibacterial activity which may be used to combat a number of microorganisms including Gram positive and Gram negative microorganisms such as Staphylococcus aureus, Escherichia coli, Klebsiella pneumoniae, Aerobacter aerogenes, and Shigella sonnei. They may be administered orally or parenterally in the form of tablets, capsules, elixirs, injectables or the like by incorporating the appropriate doses of the bases of Formula I or a physiologically acceptable salt thereof in a conventional vehicle in the same manner as penicillin G, for example.

The compounds of Formula I are prepared by reacting 6-aminopenicillanic acid with an acylating compound of the general Formula II (II)
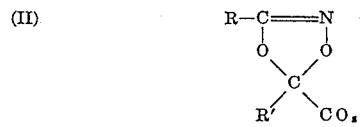

wherein R and R' have the same meaning as defined before and Z is a halide (preferably chlorine), azide, alkoxycarbonyloxy (preferably ethoxycarbonyloxy) or p-nitrophenoxy.

The reaction is preferably conducted in the presence of an organic base, such as triethylamine, N-ethylpiperidine or pyridine, in an organic solvent for the reactants, such as dimethylformamide or methylene chloride at a temperature in the range of $-10°$ to $+50°$ C., preferably $0°$ to $20°$ C. When Z is chlorine the reaction may be carried out in aqueous acetone using sodium bicarbonate as the base. Other inorganic bases may also be used.

It is preferred to use a slight excess of the acylating compound, e.g., of the order of 1 to 1.5 moles of the acylating compound to 1 mole of 6-aminopenicillanic acid (6-APA).

The product may be obtained in the acid form but it is usually desirable to isolate it in the form of one of the salts described previously, e.g., by reacting the acid with a basic compound, such as N-ethylpiperidine, potassium 2-ethylhexanoate, N,N-dibenzylethylenediamine or aqueous sodium hydroxide or calcium hydroxide.

The method of producing compounds of Formula I as well as the acylating compound of Formula II from which it is obtained is illustrated by the followwing flow diagram. The symbols have the same meaning as defined previously.

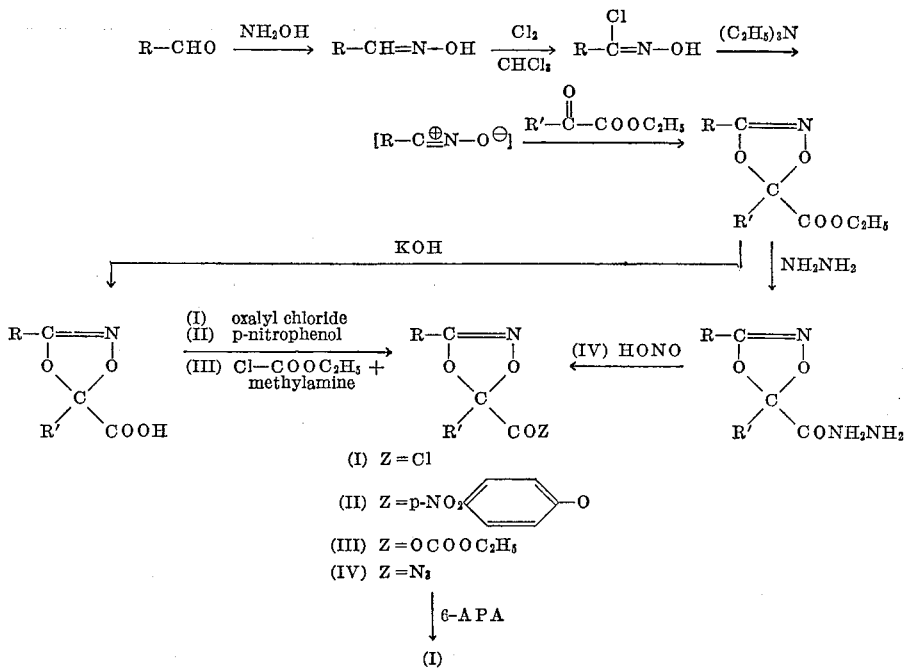

Among the suitable reactants can be mentioned the lower alkyl (e.g., ethyl) esters of
2-(lower alkyl)-5-phenyl-1,3,4-dioxazole-2-carboxylic acids, such as
2-methyl-5-phenyl-1,3,4-dioxazole-2-carboxylic acid,
2-ethyl-5-phenyl-1,3,4-dioxazole-2-carboxylic acid,
2-isopropyl-5-phenyl-1,3,4-dioxazole-2-carboxylic acid and
2-n-hexyl-5-phenyl-1,3,4-dioxazole-2-carboxylic acid;
2-[monocyclic ar(lower alkyl)]-5-phenyl-1,3,4-dioxazole-2-carboxylic acids, such as
2-benzyl-5-phenyl-1,3,4-dioxazole-2-carboxylic acid and
2-phenethyl-5-phenyl-1,3,4-dioxazole-2-carboxylic acid;
2-(lower alkyl)-5-naphthyl-1,3,4-dioxazole-2-carboxylic acids, such as
2-methyl-5-α-naphthyl-1,3,4-dioxazole-2-carboxylic acid;
2-[monocyclic ar(lower alkyl)]-5-naphthyl-1,3,4-dioxazole-2-carboxylic acids, such as
2-benzyl-5-α-naphthyl-1,3,4-dioxazole-2-carboxylic acids; and
5-aromatically substituted halo, nitro, hydroxy, amino, trifluoromethyl, lower alkyl, lower alkoxy and lower alkanoylamido derivatives of any of these, such as
2-methyl-5-p-nitrophenyl-1,3,4-dioxazole-2-carboxylic acid,
2-ethyl-5-p-chlorophenyl-1,3,4-dioxazole-2-carboxylic acid,
2-benzyl-5-p-(trifluoromethyl)-phenyl-1,3,4-dioxazole-2-carboxylic acid,
2-methyl-α-(p-chloronaphthyl)-1,3,4-dioxazole-2-carboxylic acid,
2-methyl-5-p-tolyl-1,3,4-dioxazole-2-carboxylic acid,
2-methyl-5-p-methoxyphenyl-1,3,4-dioxazole-2-carboxylic acid,
2-methyl-5-m-ethoxyphenyl-1,3,4-dioxazole-2-carboxylic acid,
2-methyl-5-p-hydroxyphenyl-1,3,4-dioxazole-2-carboxylic acid,
2-methyl-5-p-aminophenyl-1,3,4-dioxazole-2-carboxylic acid, and
2-methyl-5-p-acetamidophenyl-1,3,4-dioxazole-2-carboxylic acid;
2-(lower alkyl)-5-heterocyclic-1,3,4-dioxazole-2-carboxylic acids, such as
2-methyl-5-β-furyl-1,3,4-dioxazole-2-carboxylic acid,
2-isopropyl-5-β-thienyl-1,3,4-dioxazole-2-carboxylic acid, and
2-ethyl-5-β-pyridyl-1,3,4-dioxazole-2-carboxylic acid; and
2-[monocyclic ar(lower alkyl)]-5-heterocyclic-1,3,4-dioxazole-2-carboxylic acids, such as
2-benzyl-5-β-thienyl-1,3,4-dioxazole-2-carboxylic acid,
2-(α-thienyl)-5-phenyl-1,3,4-dioxazole-2-carboxylic acid,
2-(4-pyridylmethyl)-5-phenyl-1,3,4-dioxazole-2-carboxylic acid and the like.

The following examples are illustrative of the invention. All temperatures are expressed on the centigrade scale.

EXAMPLE 1

(a) *Preparation of 2-methyl-5-phenyl-1,3,4-dioxazole-2-carboxylic acid*

5 grams of 2-methyl-5-phenyl-1,3,4-dioxazole-2-carboxylic acid ethyl ester (Huisgen et al., Tetrahedron Letters, 1961, pp. 583–62) are added with ice-cooling to 6 ml. of 40% potassium hydroxide solution plus 7 ml. of alcohol. After agitating for 2 hours, the mixture is allowed to stand overnight.

The mixture is diluted with 10 ml. of water and the precipitated oil taken up in ether. The aqueous layer is cooled and acidified carefully with cold 10% hydrochloric acid to pH 2.5. The liberated oil is rapidly taken up in ether and dried over anhydrous magnesium sulfate. Evaporation of the ether leaves a syrup which crystallizes readily when triturated with hexane. The crude yield of acid is 2.6 g. (60%); M.P. 80–83°. Recrystallization from a benzene-hexane mixture gives 2.0 g. (45%); M.P. 83–85°.

*Analysis.*—Calc'd for $C_{10}H_9NO_4$: C, 57.97; H, 4.38; N, 6.76. Found: C, 58.11; H, 4.57; N, 6.47.

(b) *Preparation of 2-methyl-5-phenyl-1,3,4-dioxazole-2-carboxylic acid chloride*

Two grams of the carboxylic acid, obtained as described above, are dissolved in 25 ml. of anhydrous benzene, cooled to 5°, stirred, and treated dropwise with a solution of 10 ml. of oxalyl chloride in 30 ml. of benzene. After stirring one-half hour and allowing the mixture to warm to 18°, the cooling is removed, stirring continued, and one drop of pyridine added. There is almost immediately a vigorous gas evolution. Stirring is continued for another hour after gas evolution ceases.

Excess oxalyl chloride and benzene are removed at room temperature under reduced pressure. The distillation is repeated twice with fresh benzene. The yield of crude reddish oil is 2.2 g.

High vacuum distillation of the acid chloride gives a yellow oil; B.P. 80°/0.005 mm.

Analysis.—Calc'd for: $C_{10}H_8ClNO_3$: Cl, 15.71; C, 53.23; H, 3.57. Found: Cl, 15.64; C, 53.86; H, 4.15.

(c) *Preparation of (2-methyl-5-phenyl-1,3,4-dioxazol-2-yl) penicillin, potassium salt*

A solution of 1.35 g. (0.0062) of 6-aminopenicillanic acid in 45 ml. of water containing 2.7 g. (0.032 mole) of sodium bicarbonate is cooled to 5°, stirred vigorously and treated dropwise with 1.9 g. (0.0084 mole) of the above acid chloride dissolved in 5 ml. of acetone. The mixture is stirred vigorously for one-half hour at 5–10°. After extracting twice with ether, the aqueous solution is layered over with ether, cooled on ice, stirred, and acidified carefully to pH 2 with 6 N sulfuric acid.

The layers are separated and the aqueous layers extracted twice with ether. The combined ether layers are washed twice with cold water and dried over anhydrous magnesium sulfate.

The dried ethanol solution is stirred and treated with a 2 M solution of potassium 2-ethyl-hexanoate in butanol until there is no further precipitation. After cooling overnight, the finely divided solid is collected, washed with ether, and recrystallized from 50 parts of butanol to give the product; M.P. 233–235° (dec.).

Analysis.—Calc'd for: $C_{18}H_{18}N_3O_6SK$: N, 9.47; S, 7.23. Found: N, 9.54; S, 7.01.

$I_2$ assay—95.9%

IR: $2.95\mu$ (medium; amide —NH—);
$560\mu$ (strong; $\beta$-lactam C=O); $5.85\mu$ (strong; amide C=O)

EXAMPLE 2

(a) *Preparation of 2-methyl-5-phenyl-1,3,4-dioxazole-2-carboxylic acid, p-nitrophenyl ester*

To a solution of 2.05 g. of 2-methyl-5-phenyl-1,3,4-dioxazole-2-carboxylic acid and 1.67 g. of p-nitrophenol in 30 ml. of ethyl acetate, there are added 2.06 g. of dicyclohexylcarbodiimide. The reaction mixture is allowed to stand for two hours at room temperature and then 0.1 ml. of acetic acid is added. The filtered reaction mixture is concentrated and the residue crystallized from an ethyl acetatehexane mixture to yield pure p-nitrophenyl ester, M.P. 86.5–87.5°.

(b) *Preparation of (2-methyl-5-phenyl-1,3,4-dioxazol-2-yl) penicillin, triethylammonium salt*

To a solution of 95 mg. of 6-amino penicillanic acid and 0.06 ml. of triethylamine in 2 ml. of diemthylformamide, there are added 94 mg. of the p-nitrophenyl ester of 2-methyl-5-phenyl-1,3,4-dioxazole-2-carboxylic acid. The reaction mixture is allowed to stand at room temperature for 36 hours, and then 20 ml. of anhydrous ether is added, whereupon the triethylammonium salt of (2-methyl-5-phenyl-1,3,4-dioxazol-2-yl) penicillin crystallizes.

EXAMPLE 3

(a) *Preparation of 2-methyl-5-phenyl-1,3,4-dioxazole-2-carboxylic acid hydrazide*

To a solution of 5 grams of 2-methyl-5-phenyl-1,3,4-dioxazole-2-carboxylic acid ethyl ester in 25 ml. of ethanol there is added 2 ml. of 85% hydrazine hydrate and the mixture refluxed for 3 hours. The solution is diluted with water and cooled. The precipitated hydrazide of 2-methyl-5-phenyl-1,3,4-dioxazole-2-carboxylic acid is filtered and air dried.

(b) *Preparation of 2-methyl-5-phenyl-1,3,4-dioxazole-2-carboxylic acid azide*

To a cooled solution of 2-methyl-5-phenyl-1,3,4-dioxazole-2-carboxylic acid hydrazide in dilute hydrochloric acid there is added dropwise an aqueous solution of sodium nitrite until the addition causes no further precipitation of azide. The solid is filtered, washed with cold water and air dried.

(c) *Preparation of (2-methyl-5-phenyl-1,3,4-dioxazole-2-yl) penicillin, N-ethylpiperidine salt*

To a solution of 100 mg. of 6-amino-penicillanic acid in dimethylformamide there is added in small portions, with vigorous stirring, the azide of 2-methyl-5-phenyl-1,3,4-dioxazole-2-carboxylic acid. After each addition there is an evolution of nitrogen. The reaction mixture is then diluted with anhydrous ether containing N-ethylpiperidine. The N-ethylpiperidine salt of (2-methyl-5-phenyl-1,3,4-dioxazole-2-yl) penicillin precipitates. It is collected by filtration and washed thoroughly with anhydrous ether.

EXAMPLE 4

*Preparation of the N,N'-dibenzylethylenediamine salt of (2-methyl-5-phenyl-1,3,4-dioxazol-2-yl) penicillin*

To a stirred and cooled (−15) solution of 20.7 grams of 2-methyl-5-phenyl-1,3,4-dioxazole-2-carboxylic acid and 14 ml. of triethylamine in 200 ml. of dry tetrahydrofuran there is added, dropwise, 10.8 grams of ethyl chloroformate. The temperature is maintained at −10 to −15° during this addition. The reaction mixture is stirred for an additional 15 minutes at −15° and 21.6 grams of 6-aminopenicillanic acid, 15 ml. of triethylamine and 100 ml. of water is added rapidly. After the vigorous evolution of carbon dioxide stops, the reaction mixture is stirred an additional two hours. After dilution with 200 ml. of water the reaction mixture is extracted with methyl isobutyl ketone. The aqueous phase is layered over with ether and acidified with cooling to pH 2 with 20% phosphoric acid. The ether extract is washed with water and dried over anhydrous magnesium sulfate. After filtration the filtrate is treated with a solution of N,N'-dibenzylethylenediamine in ether to precipitate the (2-methyl-5-phenyl-1,3,4-dioxazol-2-yl) penicillin as the N,N-dibenzylethylenediamine salt.

EXAMPLE 5

(a) *Preparation of 2-methyl-5-p-methoxyphenyl-1,3,4-dioxazole-2-carboxylic acid, ethyl ester*

Chlorine gas is passed into a solution of p-methoxybenzaldehyde oxime in chloroform, at a temperature of 20–25° until a clear yellow solution is obtained. The solvent is removed by distillation under reduced pressure at a temperature of 25–30°. The residue is dissolved in anhydrous ether, cooled to −25° and treated dropwise with a solution of triethylamine in anhydrous ether. To this reaction mixture there is then added slowly a solution of ethyl pyruvate in anhydrous ether. The stirred reaction mixture is allowed to warm to room temperature and is kept at this temperature for 16 hours. The triethylamine hydrochloride is removed by filtration and the ether is removed by distillation. The residue is then heated gently under reduced pressure to remove unreacted ethyl pyruvate and triethylamine. The 2-methyl-5-p-methoxyphenyl-1,3,4-dioxazole-2-carboxylic acid ethyl ester is used in the subsequent hydrolysis without further purification.

(b) *Preparation of (2-methyl-5-p-methoxyphenyl-1,3,4-dioxazole-2-yl) penicillin, potassium salt*

Following the procedure of Example 1 but substituting an equivalent amount of 2-methyl-5-p-methoxyphenyl-1,3,4-dioxazole-2-carboxylic acid ethyl ester for the 2-methyl-5-phenyl-1,3,4-dioxazole-2-carboxylic acid ethyl ester, there is obtained (2-methyl-5-p-methoxyphenyl-1,3,4-dioxazol-2-yl) penicillin, potassium salt.

By using starting materials of columns I and II below wherein the symbols R and R' have the respective meanings in those columns, the additional penicillins in column III are obtained:

| Oxime of aldehyde R—CH=NOH | Ethyl ester of α-keto acid R'—CO—COOC$_2$H$_5$ | Penicillin (as potassium salt) |
|---|---|---|
| 2-thienyl | Phenyl | 2-phenyl-5-(2-thienyl)-1,3,4-dioxazol-2-yl penicillin. |
| m-Chlorophenyl | 4-pyridylmethyl | 2-(4-pyridylmethyl)-5-m-chlorophenyl-1,3,4-dioxyazol-2-yl penicillin. |
| p-Acetamido-phenyl | Benzyl | 2-benzyl-5-(p-acetamidophenyl)-1,3,4-dioxazol-2-yl penicillin. |
| Phenyl | CH$_3$CH$_2$CH$_2$ | 2-propyl-5-phenyl-1,3,4-dioxazol-2-yl penicillin. |
| Do | CH$_3$\\CHCH$_2$CH$_2$/CH$_3$ | 2-(3-methylbutyl)-5-phenyl-1,3,4-dioxazol-2-yl penicillin. |

What is claimed is:
1. A compound selected from the group consisting of 1,3,4-dioxazolylpenicillins of the formula

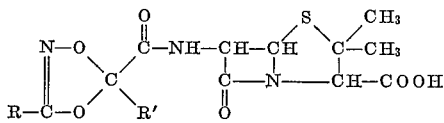

wherein R represents a member of the group consisting of $X_m$-phenyl and $X_m$-heterocyclic and R' represents a member of the group consisting of lower alkyl, $X_m$-phenyl, ($X_m$-phenyl)-lower alkyl, $X_m$-heterocyclic and ($X_m$-heterocyclic)-lower alkyl, X represents a member of the group consisting of hydrogen, halogen, nitro, hydroxy, amino, lower alkanoylamido, trihalomethyl, lower alkoxy and lower alkanoyloxy, $m$ represents a member of the group consisting of 1,2 and 3, and heterocyclic represents a member of the group consisting of furyl, pyridyl, pyrimidyl, pyrazinyl and pyridazinyl, and physiologically acceptable salts thereof with bases.

2. A compound of the formula

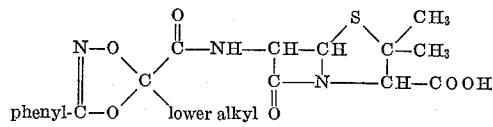

3. An alkali metal salt of a compound of claim 2.
4. A compound of the formula

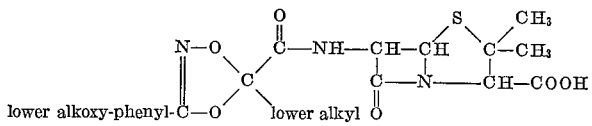

5. (2-methyl-5-phenyl-1,3,4-dioxazol-2-yl) penicillin.
6. The potassium salt of the compound of claim 5.
7. (2 - methyl - 5 - methoxyphenyl-1,3,4-dioxazol-2-yl) penicillin.

References Cited by the Examiner
UNITED STATES PATENTS
3,043,831   7/1962   Doyle et al. _____ 260—239.1

OTHER REFERENCES
Hackh's Chemical Dictionary, page 805 (Second Edition) (1937).
Wertheim: Textbook of Organic Chemistry, pages 763–764 (1945).

NICHOLAS S. RIZZO, *Primary Examiner*.